UNITED STATES PATENT OFFICE.

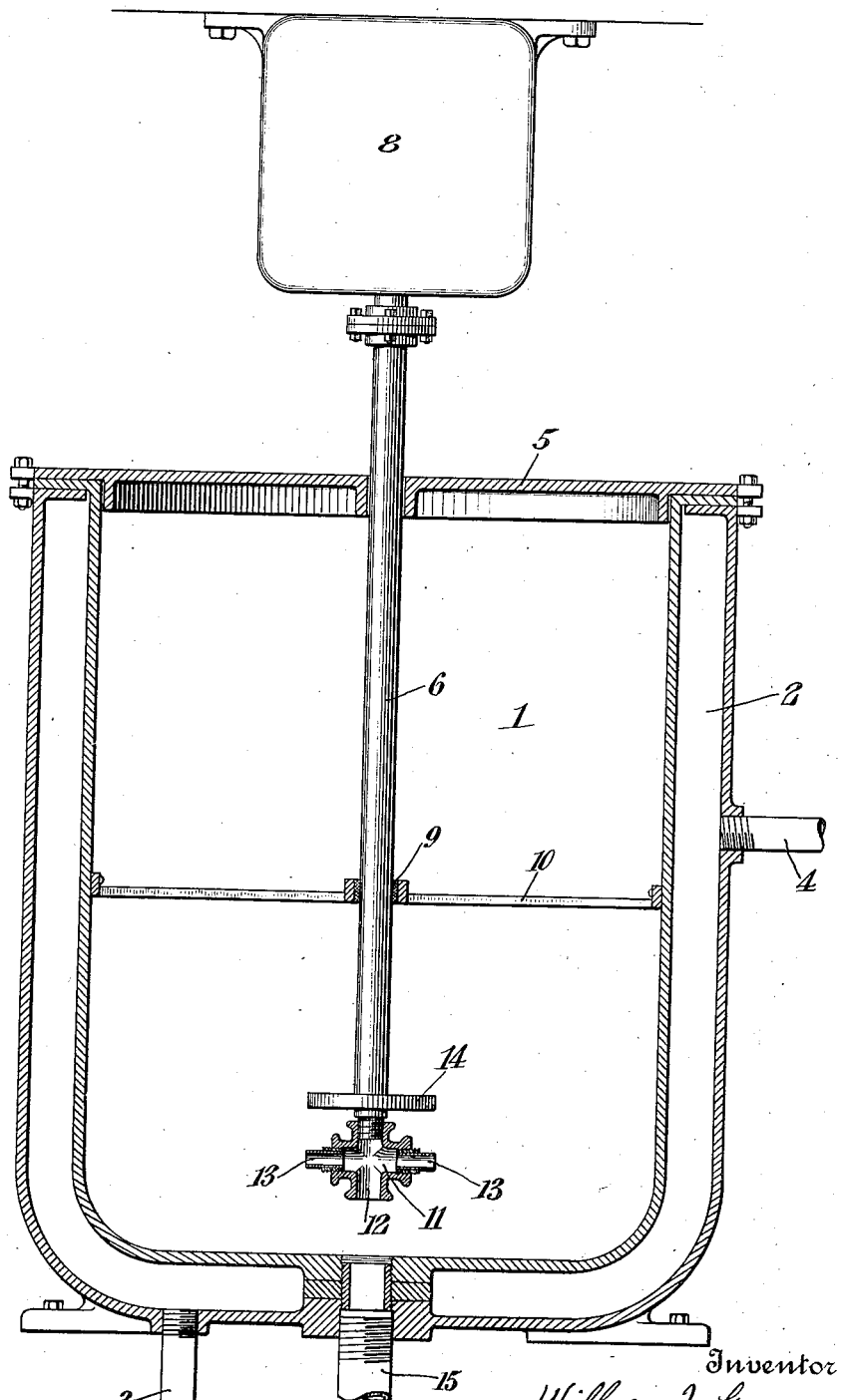

WILLIAM M. GROSVENOR, OF RIDGEWOOD, NEW JERSEY, ASSIGNOR TO PERKINS GLUE COMPANY, A CORPORATION OF PENNSYLVANIA.

ADHESIVE.

1,311,964.        Specification of Letters Patent.        Patented Aug. 5, 1919.

Application filed February 25, 1916. Serial No. 80,353.

*To all whom it may concern:*

Be it known that I, WILLIAM M. GROSVENOR, a citizen of the United States, resident of Ridgewood, county of Bergen, State of New Jersey, have invented certain new and useful Improvements Relating to Adhesives, of which the following is a specification.

My invention pertains to improvements relating to adhesives and more particularly to the protecting of starchy adhesives against the action of water. While the invention, in its broader aspects, will be found useful in adhesives generally, such as starchy adhesives for uniting paper, cloth, wood, etc., it is particularly useful in connection with adhesives for coating or sizing paper and similar materials. The main feature of the invention is the provision of an adhesive in which starch is used as an adhesive element and in which a waxy material is used to produce the desired waterproofing effect.

It has heretofore been common to coat paper with a coating or glaze in which casein was used to act as a binder and in which various amounts of wax have been used to give the paper the necessary glaze or finish. Large quantities of a suitable filler, such as clay, have been mixed with these materials, and with a considerable quantity of water, to form a coating which is applied to the paper. In this coating, the casein not only acts as a binder, but also acts to protect it against the action of water and render it substantially waterproof after the coating has been dried on the paper and the paper suitably polished. When I say it is rendered waterproof, I means simply that it does not easily absorb moisture, but repels the same to a certain extent, as is clearly understood by those skilled in the art. That is, the back of the paper being wet, the glazed or coated surface is not wholly destroyed, or a wet finger being applied on the front coated surface of the paper and held firmly against it for some time, the glaze or coating, as the case may be, is not torn away from the paper and the coating material is not carried away on the surfaces of lithographic stones or in the depressions of the type in printing.

The use of casein as a binder in paper coating has several disadvantages, one of importance being its high cost. Therefore I propose to use starch or starchy material instead of casein as a binder for the paper coating. I find, however, that if starch is merely substituted for casein, the desired result is not obtained, because the adhesive will not then be sufficiently waterproof. To accomplish the desired result in this connection, I preferably add a certain amount of suitable waxy material. And I prefer to keep the ratio of wax between $\frac{1}{4}$ and $\frac{3}{4}$ to 1 of starch. Some waxes or combination of waxes, will show the required combination of water repelling quality and likewise take a satisfactory polish better than others. In order that the waxy material may be thoroughly incorporated with the starch adhesive, I preferably burst the starch or starchy material in water, together with the wax, and the desired amount of filling material, and provide a suitable agitation to emulsify the waxy material in the batch. This prevents the waxy material from separating out, so that when the coating dries it is left homogeneous, and an even glaze may be produced thereon.

If ordinary raw starch be used the product may be too "full" or thick and gelatinous, or may have what might be called "false body", in the sense that the liquid becomes too thick with too small an amount of actual binding material. Hence I prefer to use a degenerated starchy material, depending on the use to which the adhesive is to be put and the adhesiveness required.

In carrying out my improvements in the preferred form for paper coating work, I take 10 parts by weight of a suitable starchy material, and a suitable material for this purpose is a cassava starch or tapioca flour known as "G. A. type 46," which is a cassava starch containing a small amount of fibrous material derived from the plant from which the starch is produced, and which starch has a medium or low viscosity believed to be due to incipient fermentation, though otherwise of fairly good quality. To this I add 18 parts by weight of clay, 3.2 parts of paraffin (such as Standard Oil 136° M. P.), and 0.8 parts of carnauba wax. These materials are finely ground together by grinding them for about two hours in a ball mill. The product is a fine grained white powder, of slightly waxy consistency, but in which the microscope fails to clearly distinguish wax, clay or starch. This fine powder forms a suitable base from which the paper coating or sizing may be made. The powder is in convenient form for shipment. A base of this character is particularly suitable for a heavy paper coating. If a glazed paper is to be prepared, a starchy material of less viscosity may be used, for instance, that known on the market as "T. B. crystal, 55° corn-starch", which is a corn-starch dried in lumpy form and thin boiling in the sense of having had its viscosity somewhat reduced as by alkaline treatment during the separation from the grain of corn. By degenerated starch I mean a starch which has had its viscosity reduced from that of pure raw starch. This degeneration may be accomplished either during, before or after the starch is separated from the vegetable from which it is taken, by hydrolyzing, oxidizing or other means such as fermentation, the action of enzymes, etc. It may be accomplished by the action of acids such as hydrochloric and sulfuric or by the action of alkalis such as caustic soda and peroxid of soda.

To prepare the fluid sizing or coating from this base, I preferably take 32 pounds of this powdered mixture, and add to it 100 pounds of clay, such as "English china clay," and 175 to 225 pounds of water, for coated book paper work, or 82 pounds of clay and 200 to 300 pounds of water for glazed paper work. This mixture is preferably made in a suitable mixer, such as shown in section in the accompanying drawing, which forms a part of this specification.

Referring to the drawing, the mixer comprises a suitable container 1, having an outside jacket 2, into which steam or hot water may be led or forced by means of the pipe 3, and provided with an exit pipe 4 therefor. A suitable cover is indicated at 5. 6 represents a shaft extending down into the mixer and adapted to be driven at high speed by means of electric motor 8. The shaft is provided with bearings 9 in the mixer, the bearings being supported by means of a spider 10. Secured to the lower end of shaft 6 is what may perhaps be best described as a pipe union or cross-T 11, having one opening 12 at the bottom and two lateral openings, into which are secured short pipe sections 13, of reduced cross-section. Just above the pipe union 11 is a disk 14, secured to the shaft 6. The mixer may be filled with the coating mixture to about one-third or one-half its depth. Upon revolving the shaft at high speed, the ingredients are thrown at high speed outwardly from the reduced pipe sections 13, by reason of centrifugal force, and fresh portions of the mixture are drawn up through the lower opening 12. For batches of about thirty gallons, the diameter of the opening 12 may be about ¾ inch, and the diameter of the sections 13, about ⅜ inch, the sections 13 extending about one inch outwardly from the cross-T 11. I have obtained good results by revolving the stirrer at about 1200 R. P. M. The finished fluid coating may be withdrawn from the mixer through a valve pipe 15.

While the batch is being agitated, the temperature thereof is preferably gradually raised until the starch is bursted. During the upper range of the temperature at about 45° to 60° or 70° C., when the starch bursts, the agitation should be violent, in order to insure that the wax is thoroughly incorporated in the form of an emulsion in the mixture, after which it does not separate out on cooling, and if carnauba wax is used, the temperature may be carried to about 80° C., to insure the thorough melting of the wax. When the temperature has been raised high enough and maintained long enough (say about ten minutes) to thoroughly burst the starch and emulsify the wax, the mixture is then cooled, with continued agitation. In order to emulsify the wax, the agitation is best carried out at high speed. A peripheral velocity on the stirrer of about 1000 feet per minute is preferable, and this should be combined with sufficient pumping or circulating action to maintain the clay or other filler in suspension and thoroughly circulate and shake the mixture, so that all parts may be subjected to the tearing action of the stirrer. In the mixer shown, each of the lateral pipe sections 13 acts as the delivery of a centrifugal pump with a bottom intake and at the same time as a violent agitator skimming and tearing through the liquid and breaking up the wax into very minute particles, to form substantially an emulsion of wax in water. Whether the clay acts with the wax, partly or wholly, I am not certain, but I believe the starch aids greatly in the suspension or emulsification of the wax, as the emulsions are more stable with it.

In the production of a paper coating or size of the character in question, it is important to have both the desired polishing effect and the desired waterproof effect. Whereas in the past the latter has been obtained by using casein, I find that upon using starch as a binder, the waterproofing effect can be obtained by using paraffin alone, but the polishing effect is improved by the use of cerecin or carnauba wax. I preferably use about 4 parts by weight of waxy material to 10 parts by weight of starchy material, the waxy material containing about 80 per cent. paraffin and 20 per cent. carnauba wax. For glazed paper work I preferably use, with these proportions, about 100 parts by weight of clay and 100 parts by weight of water. Obviously other waxes and proportions may be used for producing both of these effects, the amount of water and the amount of clay being varied somewhat to suit the requirements of the machine used in coating the paper, the taste of the operator and the character of glazing desired.

Instead of mixing the materials in the manner above described, first producing a dry powdered base, the fluid coating may be made up directly from the raw materials by first suspending starch in the water, then melting the waxy materials and pouring them into the suspended starch and water, and then adding the clay, talcum or other filler and then bursting the starch by heat and emulsifying the waxy material in the mixture, by violent agitation, as above explained. Or, if desired, the clay or other filler may be added after the bursting of the starch.

For producing a coating for what is called coated book paper, that is, highly coated paper used for lithographs, photogravures, &c., and in which the weight of the coating is generally greater, and the surface is frequently either matte or highly calendered, I preferably use a starchy material of higher viscosity, such as the "G. A. type 46" cassava, because of its greater binding power, although in many cases a starch considerably degenerated has material advantages. For the highly coated paper I preferably use 120 parts of clay with 10 parts of the starch and the same or a slightly less proportion of the waxy material than above specified.

While, as above explained, it is unnecessary to the broader aspects of my invention, to finely grind the starch and waxy material together before mixing them with the water, yet, there is a certain advantage in this feature, since when the starch and waxy material are so ground together preliminary to bursting and melting, I find that on bursting the starch in the high-speed agitator, a smoother and better coating or size is obtained. Also, I find that a very much more fluid and satisfactory product is secured if the high speed stirring is continued after the bursting of the starch and at the same time cold water is admitted to the jacket, and the whole mass cooled down to about 120° F. before stopping the stirring. The duration of the stirring seems to affect the fluidity, prolonged stirring increasing it. A less degenerated starch may thus be used by suitable adaption of temperature, time of stirring and degree of agitation. So that the agitation is of some importance, as is also the degree of degeneration and the amount of raw starch used. A starchy material must be selected which does not have too much "false body," i. e., apparent stiffness and fullness in the mixture, rendering it difficult to spread, whereas, in fact, its actual amount of adhesive or binding material, as well as the amount of clay, are small. With such a "false body" mixture, large amounts of water will have to be used to obtain a mixture sufficiently fluid to be properly applied and contain enough clay and binder to make a good glaze or coating. Likewise the starchy material should not be too far degenerated; that is, its viscosity too much reduced by preliminary degeneration, as a loss of binding power thereby results.

Instead of bursting the starch entirely with heat, caustic soda, or other solvent of amylo-cellulose, may be used to a greater or less extent for that purpose, with more or less heat. It is undesirable, however, to use much caustic alkali, because of its disadvantageous effects on the paper, and particularly on colors.

The quantity and nature of waxy material used is important. If starch alone were used without the waxy material, or with too little waxy material, the waterproofing, as well as the printing quality, is lost, but by using suitable waxy material, with a starch or starchy material of a suitable viscosity, the desired combined adhesive quality and waterproofness of the coating is obtained, so that it is relatively unaffected by water, to the extent that the back of the paper being wet, the glaze is not wholly destroyed, or a wet finger being applied on the glazed surface and held there for some time, the glaze or coating, as the case may be, is not torn away from the paper, and the coating material is not carried away on the surface of lithographic stones or in depressions of the type.

I believe the waterproofing effect of the waxy material is to some extent due to, or is aided by the application of heat and pressure while the adhesive is drying, although the heat and pressure may not be applied simultaneously or during the drying. The heat, I believe, serves to keep the waxy material soft or molten so that it more perfectly covers or penetrates the starchy matter and thus makes it waterproof. The pressure I also believe serves to aid in this respect. Thus when the paper coating with the above described coatings is passed over the heating drums to dry the coating and through the calender and pressure rolls, the residual colloids of starchy and waxy material seem to become more or less amalgamated.

The proportions and nature of the materials will, of course, vary with the use to which the adhesive is to be put. With adhesives for uniting paper, cloth, wood, etc., the filler or fillers will generally be omitted.

What I claim as new and desire to secure by Letters Patent is:

1. The improved process of making paper coating or size which consists in mixing together with clay about 10 parts of degenerated starch and about 4 parts of finely ground mixed wax, comprising about 80% paraffin and 20% carnauba wax, mixing this with water to form a fluid batch, and raising the temperature of the batch to melt the wax and burst the starch, while agitating the batch to emulsify the wax therein.

2. The improved process of making coating or size which consists in mixing with water about 10 parts of starch and about 4 parts of finely ground mixed wax, comprising about 80% paraffin and 20% carnauba wax, then raising the temperature of the batch to melt the wax and burst the starch, and agitating the batch to emulsify the wax therein, a filler being added to give body to the coating or size.

3. The improved process of making adhesives which consists in mixing with water, degenerated starch and a sufficient amount of wax to render the resultant dried adhesive substantially waterproof, heating the batch sufficiently to melt the wax and burst the starch, and agitating the batch to emulsify the wax therein, a filler being added.

4. The improved process of making an adhesive which consists in mixing with water, starch and a sufficient amount of wax to make the resultant dried adhesive substantially waterproof, heating the batch sufficiently to melt the wax and burst the starch, and agitating the batch to emulsify the ax therein.

5. The improved process of making adhesive which consists in mixing with water, starch and a sufficient amount of waxy matter to render the resultant dried adhesive substantially waterproof and bursting the starch.

6. The improved process of making coating or size which consists in mixing with water, starch and a sufficient amount of waxy matter to render the resultant dried coating or size substantially waterproof and bursting the starch, a filler being added to the batch.

7. The improved process of making paper coating or size, which consists in mixing with water, starch, and sufficient waxy material to render the resultant coating or size substantially waterproof, and to produce a glaze on the paper, heating the mixture sufficiently to burst the starch and melt the waxy material, and agitating the mixture to emulsify the waxy material therein.

8. The improved process of making paper coating or size which consists in mixing with water, degenerated starch, and sufficient waxy material to render the resultant dried coating or size substantially waterproof, and to produce a glaze on the paper, heating the mixture sufficiently to burst the starch and melt the waxy material, and agitating the mixture to emulsify the waxy material therein, a filler being added.

9. The improved process of making a dry base for paper coating or size, which consists in mixing together about 10 parts of degenerated starch, about 4 parts of waxy material, comprising about 80% paraffin and 20% carnauba wax, and about 14 parts of clay, and finely grinding the mixture.

10. The improved process of making a dry base for coating or size, which consists in mixing together about 10 parts of starch, about 4 parts of waxy material, and a filler, and finely grinding the mixture.

11. The improved process of making a dry base for coating or size which consists in mixing together starch, sufficient waxy material to render the resultant dried coating or size substantially waterproof, and a filler, and finely grinding the mixture.

12. The improved process of making a dry base for adhesives, which consists in mixing together starch, and sufficient waxy material to render the resultant dried adhesive substantially waterproof, and finely grinding the mixture.

13. The improved process of making a dry base for paper coating or size, which consists in mixing together starch, and sufficient waxy material to render the resultant dried coating or size substantially waterproof, and to produce a glaze on the paper, and finely grinding the mixture.

14. The improved process of making a dry base for paper coating or size, which consists in mixing together degenerated starch, and sufficient waxy material to render the resultant dried coating or size substantially waterproof, and to produce a glaze on the paper, and finely grinding the mixture as in a ball mill, a filler being added.

15. The improved dry base for paper coating or size, which consists of a mixture including about 100 parts by weight of clay, about 10 parts by weight of starch, about 4 parts by weight of waxy material, comprising about 80% paraffin and 20% carnauba wax.

16. The improved dry base for coating or size, which consists of a mixture including a filler, degenerated starch and a sufficient waxy material to render the resultant dried coating or size substantially waterproof.

17. The improved dry base for adhesives, which consists of a mixture including starch and sufficient waxy material to render the resultant dried adhesive substantially waterproof.

18. The improved dry base for paper coating or size, which consists of a mixture including starch, and sufficient waxy material to render the resultant dried coating or size substantially waterproof, and to produce a glaze on the paper.

19. The improved dry base for paper coating or size, which consists of a mixture including degenerated starch, sufficient of a waxy material to render the resultant dried coating or size substantially waterproof and further waxy material to produce a glaze on the paper, and a filler.

20. The improved coating or size, which consists of a mixture containing water, bursted starch, and sufficient waxy matter to render the resultant dried coating or size substantially waterproof.

21. The improved adhesive, which consists of a mixture containing water, bursted starch, and sufficient water repellent matter to render the resultant dried adhesive substantially waterproof.

22. The improved paper coating or size, which consists of a mixture containing water, a filler, bursted degenerated starch, sufficient of a wax to render the resultant dried coating or size substantially waterproof, and further waxy material to produce a glaze on the paper.

23. The improved paper coating or glaze, which consists of a mixture containing water, starch, sufficient of a waxy material to render the resultant coating or glaze substantially waterproof, and further waxy material to produce a glaze on the paper.

In testimony whereof, I have signed my name to this specification.

WILLIAM M. GROSVENOR.